(12) United States Patent
Lai et al.

(10) Patent No.: US 7,847,668 B2
(45) Date of Patent: Dec. 7, 2010

(54) INDUCTOR

(75) Inventors: Chih-Huang Lai, Hsinchu (TW);
Ruo-Fan Jiang, Hsinchu (TW);
Nazmun Nahar Shams, Hsinchu (TW);
Chao-Chien Chiang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 369 days.

(21) Appl. No.: 11/969,307

(22) Filed: Jan. 4, 2008

(65) Prior Publication Data
US 2009/0009278 A1    Jan. 8, 2009

(30) Foreign Application Priority Data
Jul. 3, 2007    (TW) .............................. 96124105 A

(51) Int. Cl.
*G11B 5/17* (2006.01)
*H01F 5/00* (2006.01)
(52) U.S. Cl. ................................. 336/200; 360/123.01
(58) Field of Classification Search ................ 336/200, 336/223, 232; 360/123.01, 126
See application file for complete search history.

(56) References Cited

U.S. PATENT DOCUMENTS

| 7,027,272 B2* | 4/2006 | Furukawa et al. ...... 360/324.12 |
| 7,158,344 B2* | 1/2007 | Sato ...................... 360/123.38 |
| 2005/0162786 A1* | 7/2005 | Meguro et al. ........... 360/324.2 |

OTHER PUBLICATIONS

10TH Joint MMM/Intermag Conference, Jan. 7-11, 2007, Baltimore, Maryland (MMM-Intermag 2007) Abstracts.

* cited by examiner

*Primary Examiner*—Anh T Mai
*Assistant Examiner*—Joselito Baisa
(74) *Attorney, Agent, or Firm*—Occhiuti Rohlicek & Tsao LLP

(57) ABSTRACT

An inductor includes: a substrate; an insulator layer; a conductive coil; and a permeability-enhancing film of a multi-layer structure. The multi-layer structure includes at least one repeating unit that has at least two layers. The two layers exhibit an exchange-coupling effect and include a first ferromagnetic layer of a first ferromagnetic material and an exchange-coupling layer.

14 Claims, 10 Drawing Sheets

INDUCTOR

CROSS-REFERENCE TO RELATED APPLICATION

This application claims priority of Taiwanese application no. 096124105, filed on Jul. 3, 2007.

BACKGROUND OF THE INVENTION

1. Field of the Invention

This invention relates to an inductor, more particularly to an inductor having a permeability-enhancing film.

2. Description of the Related Art

A conventional inductor usually includes a conducting material formed on a substrate and a magnetic material positioned in close proximity to the conducting material.

U.S. Patent Application Publication No. 2005/0120543 discloses an inductor including a plurality of conductive members, an insulator layer enclosing portions of each of the conductive members, and a magnetic layer enclosing the insulator layer. By forming the insulator layer and adding magnetic particles into the insulator layer, a ferromagnetic resonance frequency of the magnetic layer, and a quality factor and a self-resonance frequency of the inductor can be enhanced.

SUMMARY OF THE INVENTION

The object of the present invention is to provide an inductor having a permeability-enhancing film that can also enhance an inductance, a self-resonance frequency and the quality factor of an inductor.

According to the present invention, an inductor comprises: a substrate; an insulator layer disposed on the substrate; a conductive coil embedded in the insulator layer; and a permeability-enhancing film of a multi-layer structure disposed on a selected one of the substrate and the insulator layer. The multi-layer structure includes at least one repeating unit that has at least two layers. The two layers exhibit an exchange-coupling effect and include a first ferromagnetic layer of a first ferromagnetic material and an exchange-coupling layer magnetically coupled to the first ferromagnetic layer.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
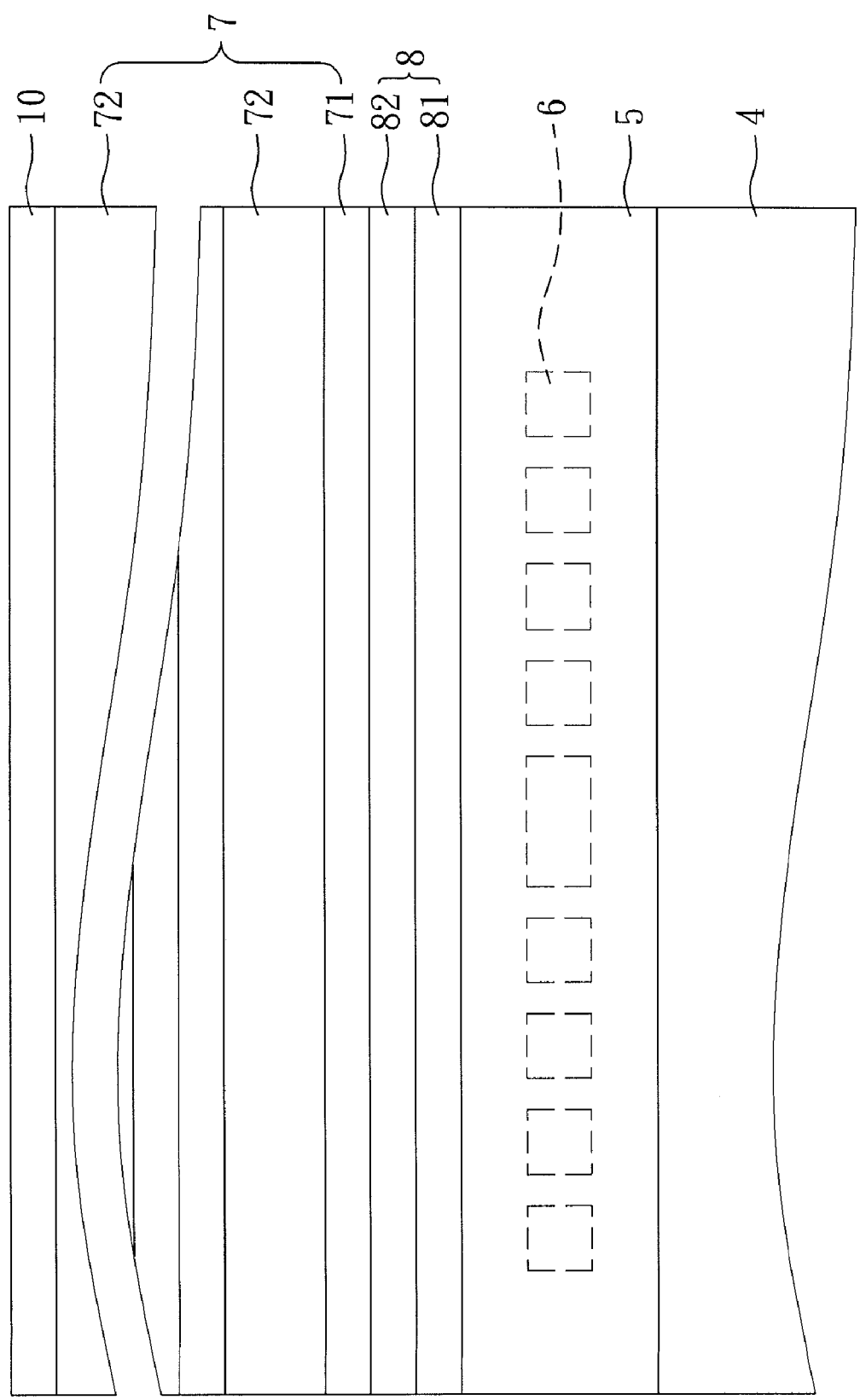
FIG. 1 is a fragmentary schematic view of the first preferred embodiment of an inductor to illustrate a permeability-enhancing film having a bi-layer structure according to this invention.
Figure 2:
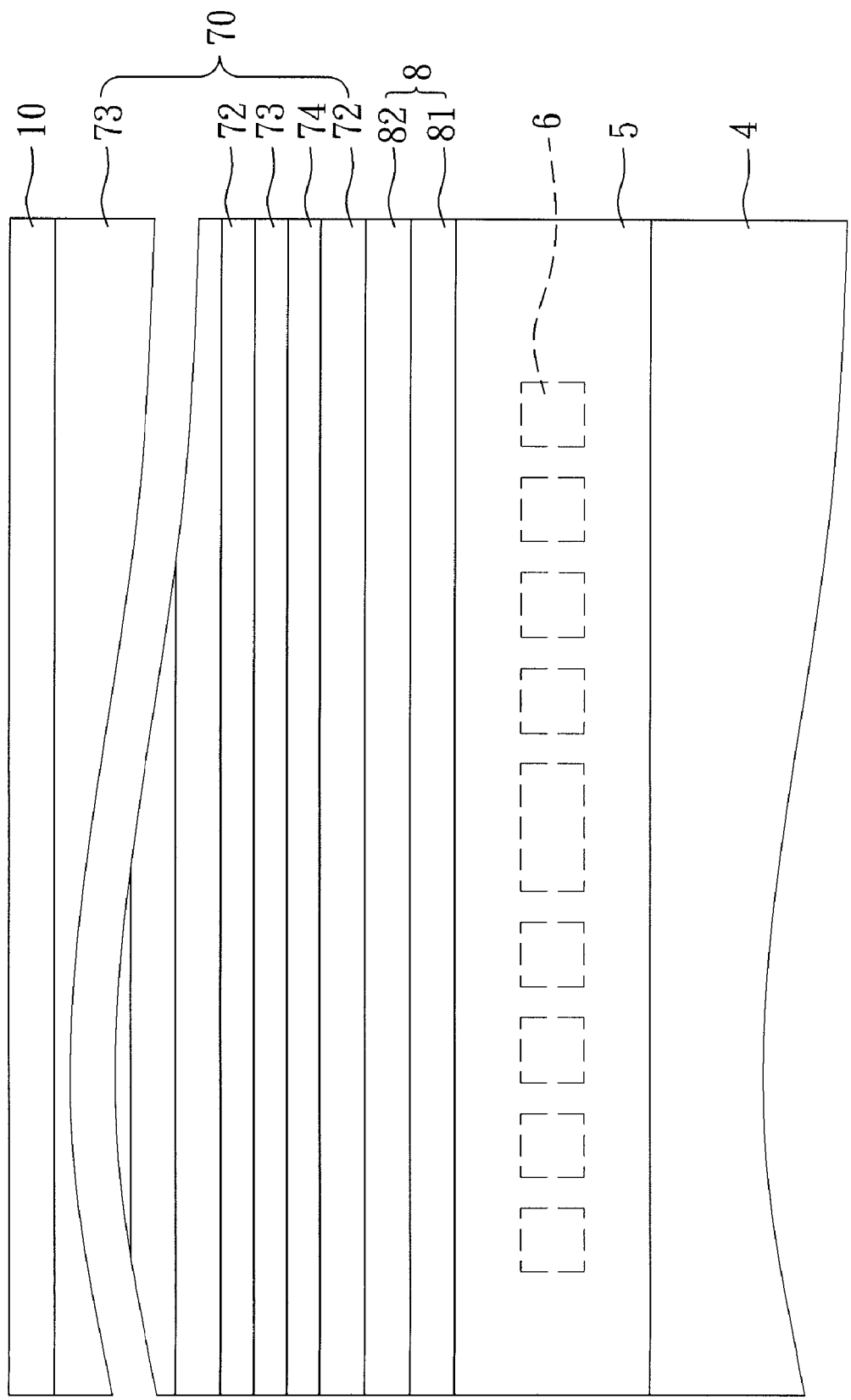
FIG. 2 is a fragmentary schematic view of the second preferred embodiment to illustrate a permeability-enhancing film having a tri-layer structure.

Referring to FIGS. 1 and 2, the inductor of this invention includes: a substrate 4; an insulator layer 5 disposed on the substrate 4; a conductive coil 6 embedded in the insulator layer 5; and a permeability-enhancing film of a multi-layer structure disposed on a selected one of the substrate 4 and the insulator layer 5. The multi-layer structure includes at least one repeating unit that has at least two layers. The two layers exhibit an exchange-coupling effect and include a first ferromagnetic layer 72 of a first ferromagnetic material and an exchange-coupling layer 71 magnetically coupled to the first ferromagnetic layer 72 in such a manner that magnetic moments of the first ferromagnetic layer 72 are aligned along the set direction through the interfacial exchange-coupling between the first ferromagnetic layer 72 and the exchange-coupling layer 71.

In the first preferred embodiment, the repeating unit is a bi-layer structure 7 (see FIG. 1) including the first ferromagnetic layer 72 of the first ferromagnetic material and the exchange-coupling layer 71.

In the second preferred embodiment, the repeating unit is a tri-layer structure 70 (see FIG. 2) including the first ferromagnetic layer 72 of the first ferromagnetic material, a second ferromagnetic layer 73 of a second ferromagnetic material, and an interlayer 74 sandwiched between the first and second ferromagnetic layers 72, 73. The second ferromagnetic layer 73 cooperates with the interlayer 74 to define the exchange-coupling layer 71.

In the first preferred embodiment, i.e., using the bi-layer structure 7 as the permeability-enhancing film, the first ferromagnetic material of the first ferromagnetic layer 72 of the bi-layer structure 7 preferably has a permeability greater than 10 under a frequency ranging from 0.1 MHz to 10 GHz, more preferably, ranging from 10 to 10000. Most preferably, the permeability of the first ferromagnetic material of the first ferromagnetic layer 72 of the bi-layer structure 7 ranges from 10 to 5000.

It is noted that permeability is a property of a material. A Co-based alloy or a Fe-based alloy, such as CoSiO, CoAlO, CoSiPdO, CoFe, CoFeAlO, FeAlO, FeMgO, CoCrO, CoZrNb, CoFeZrO, and CoFeHFO, normally has a permeability of approximately 2000.

Preferably, the material of the exchange-coupling layer 71 of the bi-layer structure 7 is capable of enhancing an anisotropy field ($H_k$) of the first ferromagnetic material of the first ferromagnetic layer 72 of the bi-layer structure 7 in a magnitude greater than 10%. The anisotropy field is directly proportional to a ferromagnetic resonance frequency of the first ferromagnetic material 72.

Preferably, the exchange-coupling layer 71 of the bi-layer structure 7 is made from a material selected form the group consisting of an antiferromagnetic material, a ferrimagnetic material, a hard magnetic material, and combinations thereof.

In the first preferred embodiment, the exchange-coupling layer 71 is made from an antiferromagnetic material.

In the first preferred embodiment, the exchange-coupling layer 71 of the bi-layer structure 7 is disposed on the insulator layer 5, and the first ferromagnetic layer 72 of the bi-layer structure 7 is disposed on the exchange-coupling layer 71.

Preferably, the permeability-enhancing film of the bi-layer structure 7 has a layer thickness ranging from 10 nm to 25 μm.

Preferably, the multi-layer structure of the first preferred embodiment includes a plurality of the repeating units, more preferably, the repeating units are in a number ranging from 2 to 500.

Preferably, the exchange-coupling layer 71 of the bi-layer structure 7 has a first layer thickness, and the first ferromagnetic layer 72 of the bi-layer structure 7 has a second layer thickness. The ratio of the first layer thickness to the second layer thickness ranges from 1 to 25.

In the first preferred embodiment, the antiferromagnetic material of the exchange-coupling layer 71 of the bi-layer structure 7 is an Ir—Mn alloy, and the first ferromagnetic material of the first ferromagnetic layer 72 of the bi-layer structure 7 is a Co—Fe alloy.

It is noted that exchange coupling of the bi-layer structure 7 occurs at an interface between the exchange-coupling layer 71 and the first ferromagnetic layer 72. When the number of the bi-layer structure 7 increases, the number of the interfaces increases correspondingly so as to enhance the magnetic exchange coupling. Moreover, since the total layer thickness of the permeability-enhancing film remains constant, the first layer thickness of the exchange-coupling layer 71 and the second layer thickness of the first ferromagnetic layer 72 will be decreased when the number of the bi-layer structure 7 is increased. Such decrease in the layer thickness can result in loss of magnetic property. For example, when the layer thicknesses of the exchange-coupling layer (Ir—Mn) 71 and the first ferromagnetic layer (Co—Fe) 72 are less than 4 nm and 1 nm, respectively, the antiferromagnetic property of the Ir—Mn and the ferromagnetic property of the Co—Fe will be lost.

Preferably, the Ir—Mn alloy has Ir in an amount of up to 50 atomic ratio, more preferably, ranging of up to 35 atomic ratio.

Preferably, the Co—Fe alloy has Co in an amount ranging from 30 to 90 atomic ratio, more preferably, ranging from 50 to 90 atomic ratio.

In the first preferred embodiment, the inductor further includes a seed film 8 sandwiched between the permeability-enhancing film and the insulator layer 5, and a covering film 10 disposed on the permeability-enhancing film. The seed film 8 has a Ta layer 81 formed on the insulator layer 6 and a Cu layer 82 formed on the Ta layer 81.

Preferably, the conductive coil 6 is made from a material selected from the group consisting of Cu, Al, Au, Ag, Pt, and combinations thereof.

Preferably, the insulator layer 5 is made from an oxide compound, such as $SiO_2$, $Al_2O_3$, and MgO, or a polymer, such as PMMA and polyimide.

In the first preferred embodiment, the insulator layer 5 is made from $SiO_2$.

Although the magnetic moments of the antiferromagnetic material are not naturally unidirectional, they can become unidirectional by subjecting the antiferromagnetic material to an annealing treatment under a magnetic field.

Thus, the permeability-enhancing film employed in the inductor is formed by subjecting it to an annealing treatment under an annealing temperature of 100° C.-500° C. for 10-180 min under an applied magnetic field ranging from 10 Oe to 20000 Oe so as to achieve a desired exchange coupling effect.

In the second preferred embodiment, i.e., using the tri-layer structure 70 as the permeability-enhancing film, the interlayer 74 is made from a material selected from the group consisting of Ru, Cr, Cu, Al, Ga, In, Ag, Au, Zn, Ti, V, Mo, W, Ta, Nb, Rh, Ir, Pt, Pd, Os, Sc, and combinations thereof. Preferably, the interlayer 74 is Ru or Cr. In one example, the tri-layer structure 70 of the permeability-enhancing film is CoFe/Ru/CoFe, and has a ferromagnetic resonance frequency of 6.34 GHz when the layer thicknesses of CoFe and Ru are 50 nm and 1 nm, respectively.

The merits of the inductor of this invention will become apparent with reference to the following Examples and Comparative Examples.

EXAMPLES

Example 1

A Si substrate 4 was provided with the conductive coil 6 thereon. The insulator layer 5 of $SiO_2$ having a layer thickness of 1 μm was then formed on the Si substrate 4 to enclose the conductive coil 6. The conductive coil 6 employed was made from Cu, and was a 100 μm×100 μm five-turn square spiral coil. The conductive coil 6 had a line width of 5 μm and a space of 1 μm between adjacent turns. The seed layer 8 having the Ta layer 81 of 3 nm in thickness and the Cu layer 82 of 6.5 nm in thickness was then formed on the insulator layer 5. The antiferromagnetic layer 71 of $Ir_{20}Mn_{80}$ with a layer thickness of 8 nm was then formed on the seed layer 8 by applying an output power of 15W and a bias of −100V on a $Ir_{20}Mn_{80}$ target in a magnetron DC sputtering system under a working pressure of 3 mtorr. The first ferromagnetic layer 72 of $Co_{20}Fe_{80}$ with a layer thickness of 200 nm was subsequently formed on the antiferromagnetic layer 71 by applying an output power of 30W on a $CO_{20}Fe_{80}$ target under the same working pressure. The antiferromagnetic layer 71 and the first ferromagnetic layer 72 thus formed were subjected to annealing treatment under a temperature of 200° C. and an applied magnetic field of 100 Oe for 20 min so as to form the permeability-enhancing film. The covering layer 10 having a layer thickness of 3 nm was then formed on the first ferromagnetic layer 72. Note that the permeability of the first ferromagnetic layer 72 thus formed was about 500 under a frequency of 1 MHz.

Figure 3:
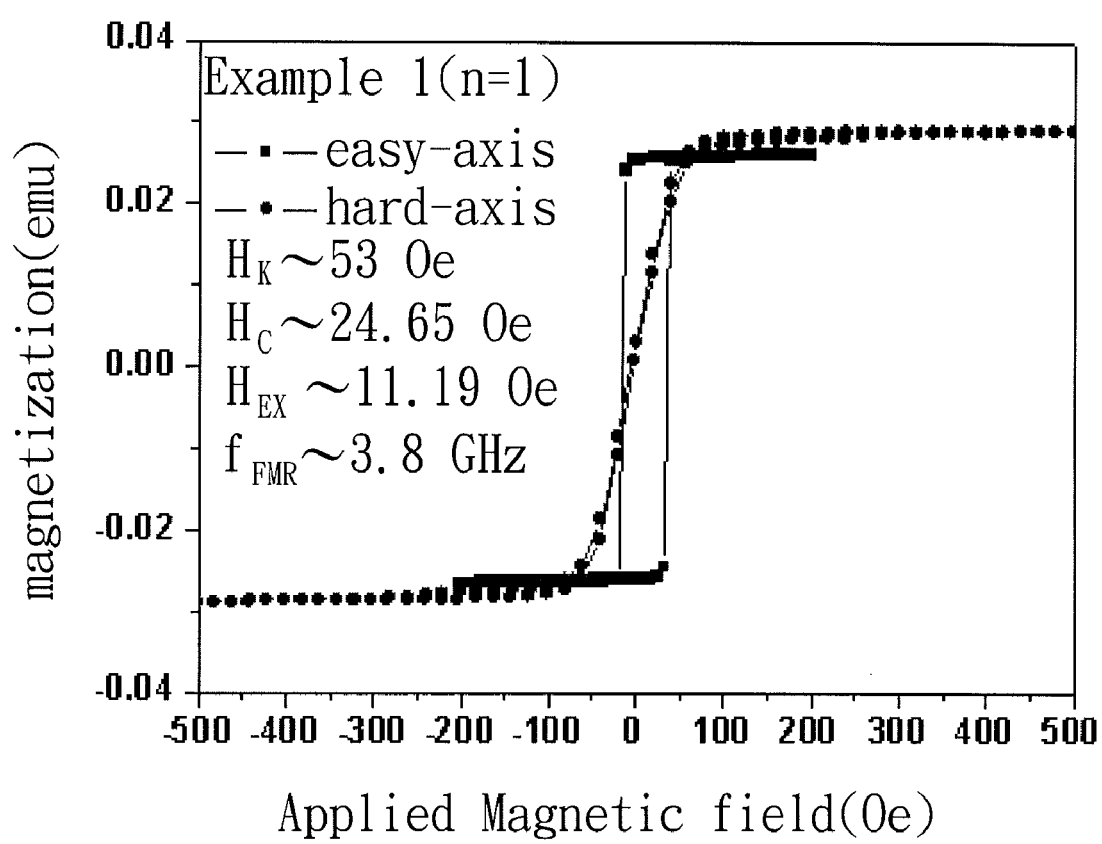
FIG. 3 is a plot showing magnetization/applied magnetic field relation of Example 1 of the first preferred embodiment.

FIG. 3 is a plot showing magnetization/applied magnetic field relation of Example 1. The results shown in FIG. 3 were analyzed and calculated for obtaining an anisotropy field ($H_k$) and a ferromagnetic resonance frequency of the inductor thus formed, which were 53 Oe and 3.8 GHz, respectively.

Example 2

The inductor of Example 2 was prepared using steps similar to those of Example 1, except that the permeability-enhancing film had two bi-layer structures 7 having a total layer thickness of 216 nm. The thicknesses of the antiferromagnetic layer (exchange-coupling layer) 71 and the first ferromagnetic layer 72 were 8 nm and 100 nm, respectively.

Figure 4:
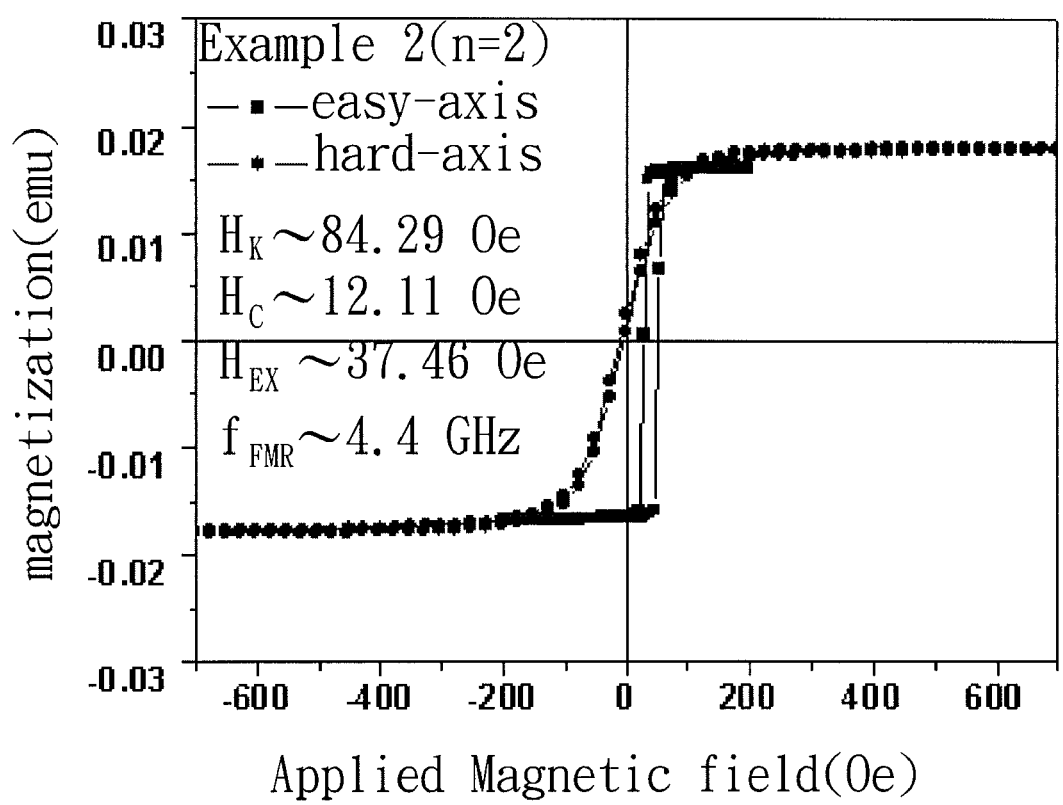
FIG. 4 is a plot showing magnetization/applied magnetic field relation of Example 2 of the first preferred embodiment.

FIG. 4 is a plot showing magnetization/applied magnetic field relation of Example 2. The inductor had an anisotropy field ($H_k$) of 84.29 Oe and a ferromagnetic resonance frequency of 4.4 GHz.

Example 3

The inductor of Example 3 was prepared using steps similar to those of Example 1, except that the permeability-enhancing film had four bi-layer structures 7 having a total layer thickness of 232 nm. The thicknesses of the antiferromagnetic layer 71 and the first ferromagnetic layer 72 were 8 nm and 50 nm, respectively.

Figure 5:
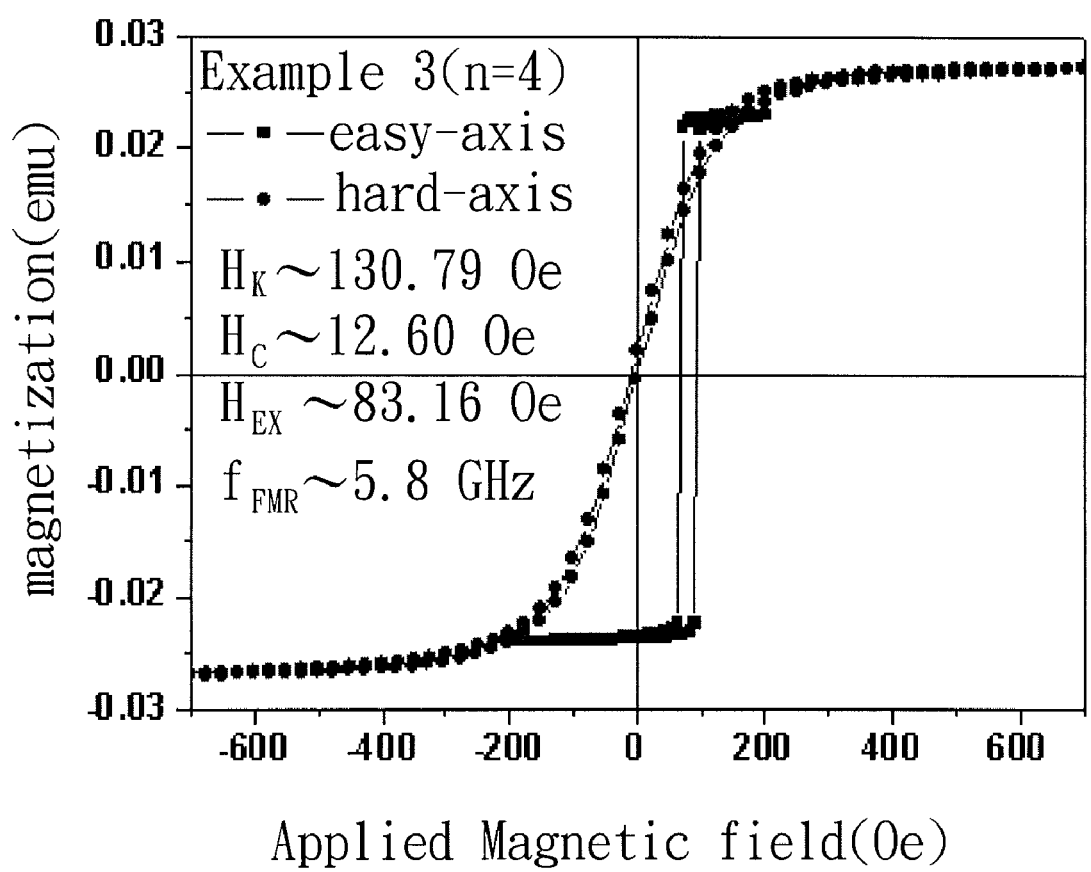
FIG. 5 is a plot showing magnetization/applied magnetic field relation of Example 3 of the first preferred embodiment.

FIG. 5 is a plot showing magnetization/applied magnetic field relation of Example 3. The inductor had an anisotropy field ($H_k$) of 130.79 Oe and a ferromagnetic resonance frequency of 5.8 GHz.

Example 4

The inductor of Example 4 was prepared using steps similar to those of Example 1, except that the permeability-enhancing film had five bi-layer structures 7 having a total layer thickness of 240 nm. The thicknesses of the antiferromagnetic layer 71 and the first ferromagnetic layer 72 were 8 nm and 40 nm, respectively.

Figure 6:
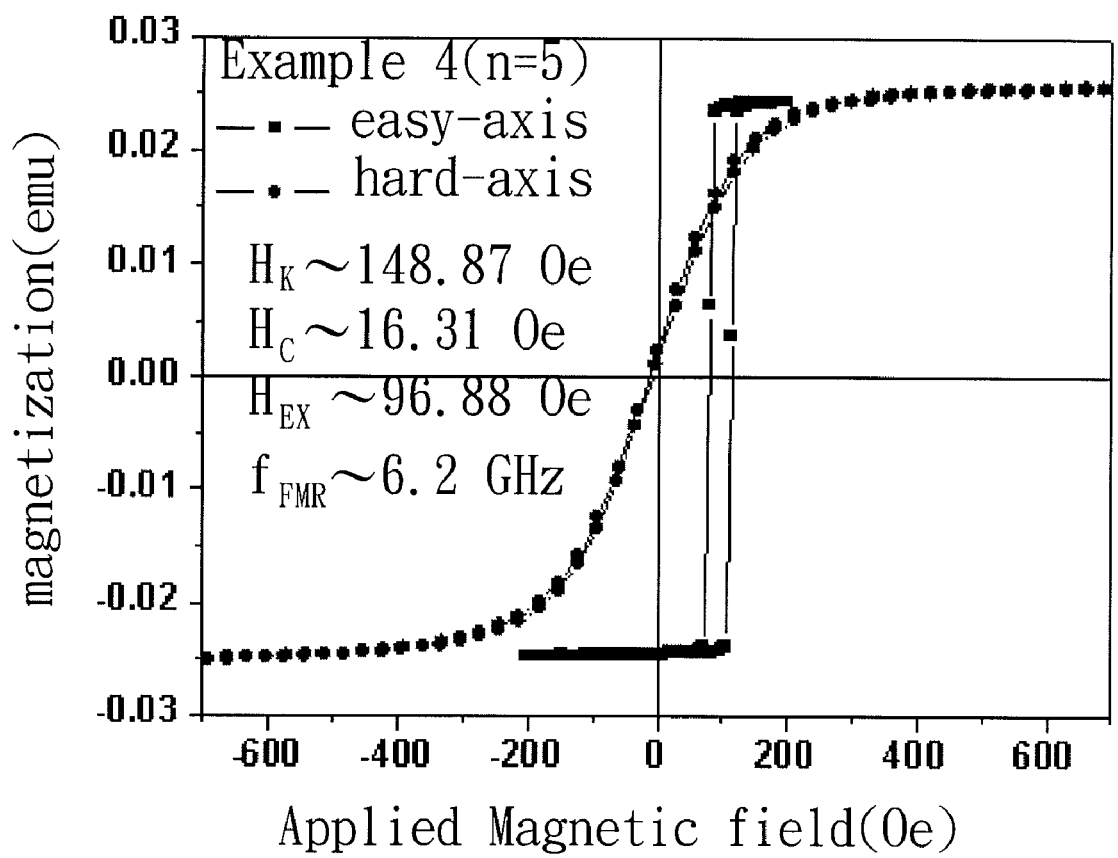
FIG. 6 is a plot showing magnetization/applied magnetic field relation of Example 4 of the first preferred embodiment.

FIG. 6 is a plot showing magnetization/applied magnetic field relation of Example 4. The inductor had an anisotropy field ($H_k$) of 148.87 Oe and a ferromagnetic resonance frequency of 6.2 GHz.

Example 5

In this example, the permeability-enhancing film was the tri-layer structure 70 of CoFe/Ru/CoFe. The respective layer thicknesses for CoFe, Ru, and CoFe were 50 nm, 1 nm, and 50 nm.

Figure 7:
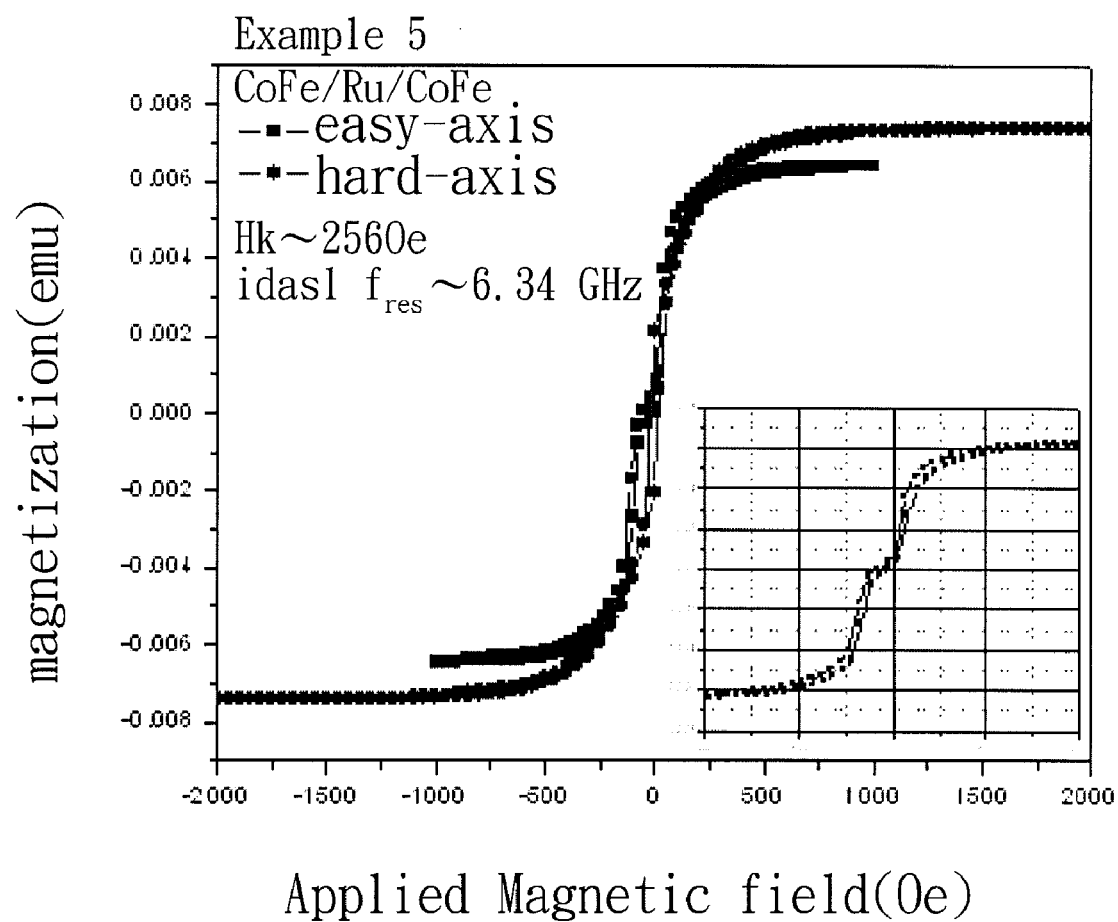
FIG. 7 is a plot showing magnetization/applied magnetic field relation of Example 5 of the second preferred embodiment.

FIG. 7 is a graph showing magnetization/applied magnetic field relation of Example 5. The inductor had an anisotropy field ($H_k$) of 256 Oe and a ferromagnetic resonance frequency of 6.34 GHz.

Comparative Example 1

The inductor of Comparative Example 1 was prepared using steps similar to those of Example 1, except that only the first ferromagnetic layer 72 was formed on the insulator layer 5. The anisotropy field ($H_k$) of the inductor was 40 Oe.

As compared to the Comparative Example 1, the anisotropy field of Examples 1-5 had an improvement of 32%, 110%, 225%, 270%, and 540%, respectively.

Comparative Example 2

The inductor of Comparative Example 2 was prepared using steps similar to those of Example 1, except that Comparative Example 2 was not formed with the permeability-enhancing film, the seed layer 8 and the covering layer 10 on the insulator layer 5.

Figure 8:
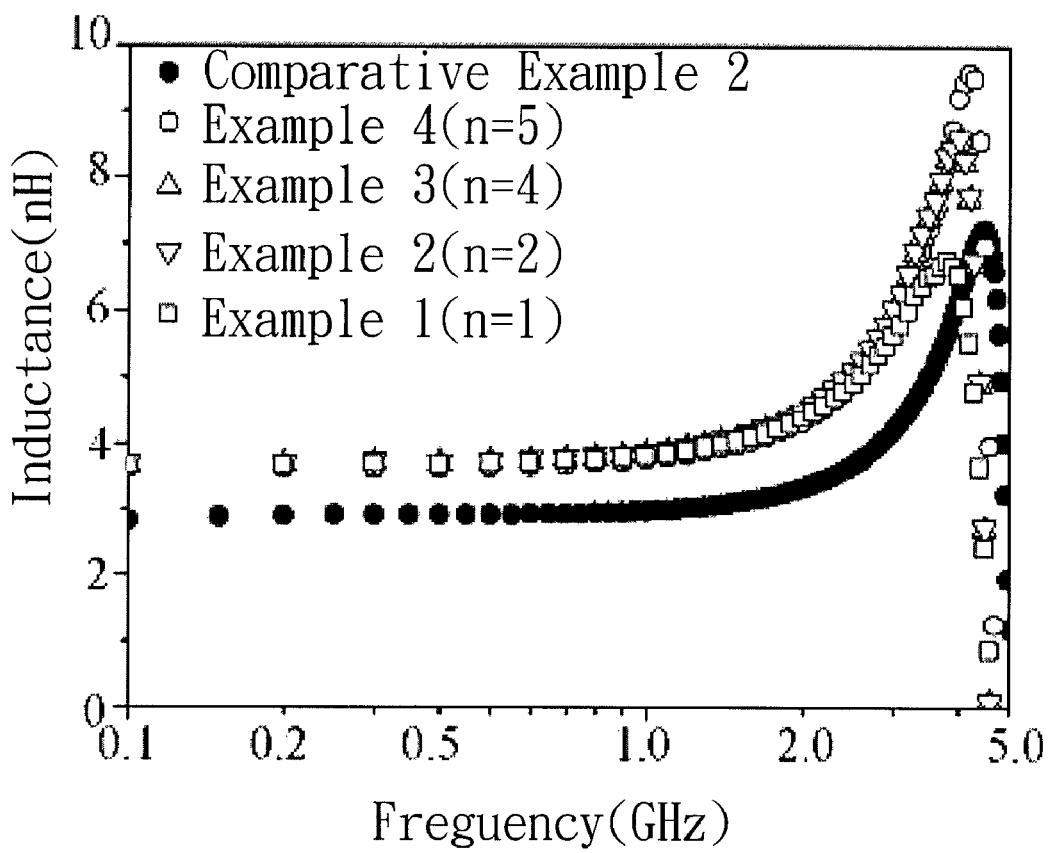
FIG. 8 is a plot showing inductance/frequency relation of Examples 1-4 of the first preferred embodiment and Comparative Example 2.

FIG. 8 is a plot showing the inductance/frequency relation of Examples 1-4 and Comparative Example 2.

Figure 9:
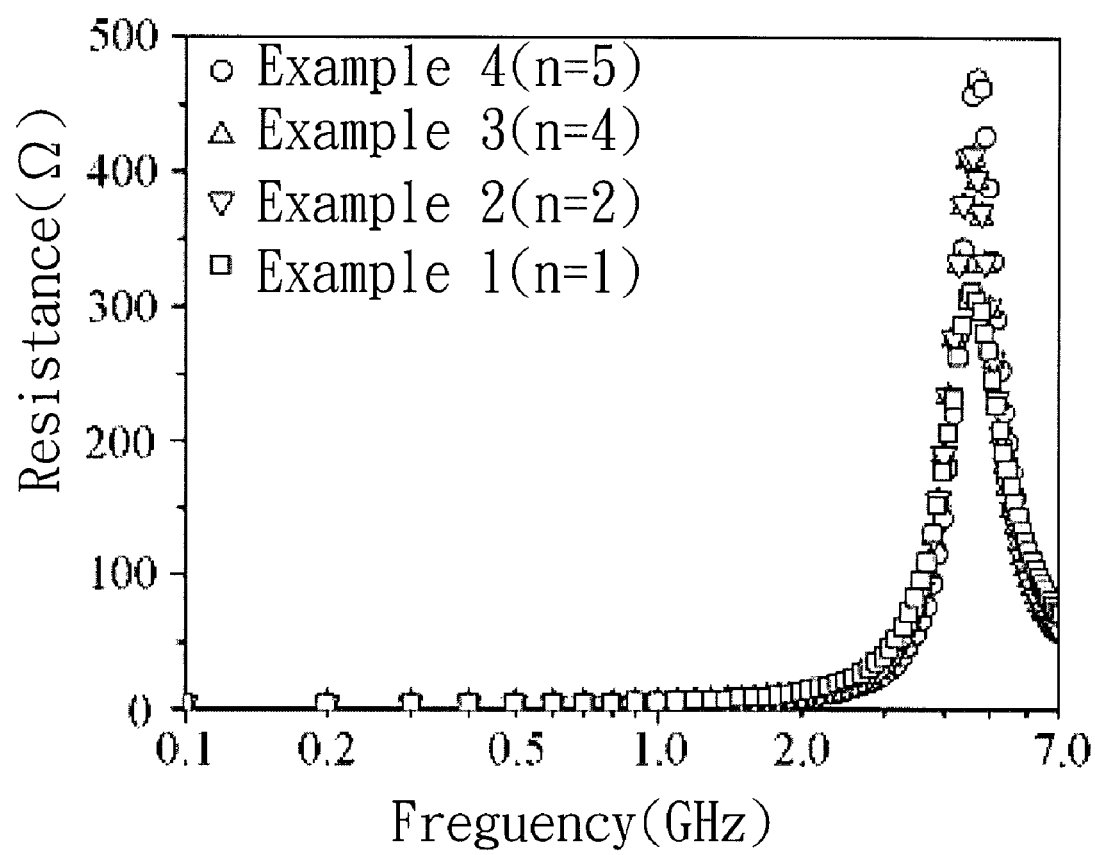
FIG. 9 is a plot showing resistance/frequency relation of Examples 1-4 of the first preferred embodiment.

FIG. 9 is a plot showing the resistance/frequency relation of Examples 1-4, each of which had a maximum resistance of 300Ω, 400Ω, 400Ω, and 470Ω.

Figure 10:
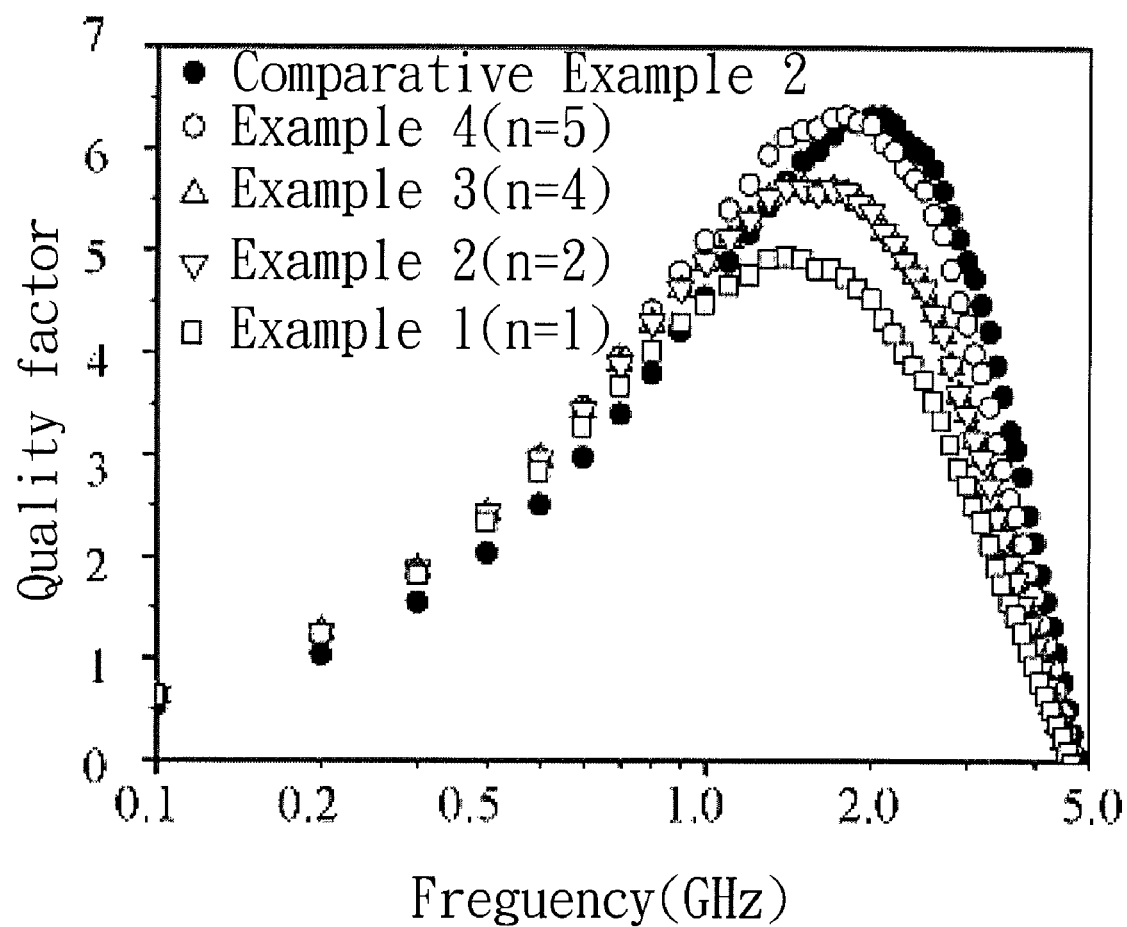
FIG. 10 is a plot showing quality factor/frequency relation of Examples 1-4 of the first preferred embodiment and Comparative Example 2.

FIG. 10 is a plot showing the quality factor/frequency relation of Examples 1-4 and Comparative Example 2. Although inclusion of the first ferromagnetic layer 72 in the inductor can increase the anisotropy field ($H_k$) and the inductance of the inductor, the maximum quality factor of the inductor is decreased. However, the results show that the quality factors of Examples 1-4 were proximate to that of Comparative Example 2.

It has thus been shown that, by forming the permeability-enhancing film, the ferromagnetic resonance frequency of the first ferromagnetic layer 72, and the inductance, the self-resonance frequency, and the quality factor of the inductor can be enhanced.

With the invention thus explained, it is apparent that various modifications and variations can be made without departing from the spirit of the present invention. It is therefore intended that the invention be limited only as recited in the appended claims.

What is claimed is:

1. An inductor comprising:
   a substrate;
   an insulator layer disposed on said substrate;
   a conductive coil embedded in said insulator layer; and
   a permeability-enhancing film of a multi-layer structure disposed on a selected one of said substrate and said insulator layer;
   wherein said multi-layer structure includes at least one repeating unit that is a bi-layer structure having two layers;
   wherein said two layers exhibit an exchange-coupling effect and include a first ferromagnetic layer of a first ferromagnetic material and an exchange-coupling layer magnetically coupled to said first ferromagnetic layer; and
   wherein said first ferromagnetic material of said first ferromagnetic layer of said bi-layer structure has a permeability greater than 10 under a frequency ranging from 0.1 MHz to 10 GHz, and the material of said exchange-coupling layer of said bi-layer structure is capable of enhancing an anisotropy field of said first ferromagnetic material of said first ferromagnetic layer of said bi-layer structure in a magnitude greater than 10%.

2. The inductor of claim 1, wherein said exchange-coupling layer is composed of a second ferromagnetic layer of a second ferromagnetic material, and an interlayer sandwiched between said first and second ferromagnetic layers.

3. The inductor of claim 1, wherein the permeability of said first ferromagnetic material of said first ferromagnetic layer of said bi-layer structure ranges from 10 to 10000 under a frequency ranging from 0.1 MHz to 10 GHz.

4. The inductor of claim 1, wherein said exchange-coupling layer of said bi-layer structure is made from a material selected from the group consisting of an antiferromagnetic material, a ferrimagnetic material, a hard magnetic material, and combinations thereof.

5. The inductor of claim 4, wherein said exchange-coupling layer is made from an antiferromagnetic material.

6. The inductor of claim 5, wherein said antiferromagnetic material of said exchange-coupling layer of said bi-layer structure is an Ir—Mn alloy, and said first ferromagnetic material of said first ferromagnetic layer of said bi-layer structure is a Co—Fe alloy.

7. The inductor of claim 6, wherein said Ir—Mn alloy has Ir in an amount of up to 50 atomic ratio, and said Co—Fe alloy has Co in an amount ranging from 30 to 90 atomic ratio.

8. The inductor of claim 1, wherein said exchange-coupling layer of said bi-layer structure is disposed on said insulator layer, and said first ferromagnetic layer of said bi-layer structure is disposed on said exchange-coupling layer.

9. The inductor of claim 8, wherein said permeability-enhancing film has a layer thickness ranging from 10 nm to 25 µm.

10. The inductor of claim 9, wherein said multi-layer structure includes a plurality of said repeating units, said repeating units being in a number ranging from 2 to 500.

11. The inductor of claim 10, wherein said exchange-coupling layer of said bi-layer structure has a first layer thickness, and said first ferromagnetic layer of said bi-layer structure has a second layer thickness, the ratio of the first layer thickness to the second layer thickness ranging from 1 to 25.

12. The inductor of claim 1, further comprising a seed film sandwiched between said permeability-enhancing film and said insulator layer, and a covering film disposed on said permeability-enhancing film, said seed film having a Ta layer formed on said insulator layer and a Cu layer formed on said Ta layer.

13. The inductor of claim 1, wherein said conductive coil is selected from the group consisting of Cu, Al, Au, Ag, Pt, and combinations thereof.

14. The inductor of claim 1, wherein said insulator layer is made from $SiO_2$.

* * * * *